United States Patent [19]
Suzuka et al.

[11] Patent Number: 5,315,336
[45] Date of Patent: May 24, 1994

[54] BATTERY HOUSING STRUCTURE

[75] Inventors: Shinya Suzuka; Norimichi Takahashi, both of Tokyo, Japan

[73] Assignee: Asahi Kogaku Kogyo Kabushiki Kaisha, Tokyo, Japan

[21] Appl. No.: 641,727

[22] Filed: Jan. 15, 1991

[30] Foreign Application Priority Data

| Jan. 22, 1990 | [JP] | Japan | 2-4490[] |
| Feb. 28, 1990 | [JP] | Japan | 2-18783[U] |
| Aug. 30, 1990 | [JP] | Japan | 2-91062[U] |

[51] Int. Cl.$^5$ .............................................. G03B 17/02
[52] U.S. Cl. .............................................. 354/288
[58] Field of Search .................... 354/288; 429/96, 100

[56] References Cited

U.S. PATENT DOCUMENTS

| 3,777,639 | 12/1973 | Lange | 354/288 |
| 4,666,278 | 5/1987 | Uematsu et al. | 354/288 |
| 4,712,898 | 12/1987 | Haraguchi | 354/288 |
| 4,853,302 | 8/1989 | Yamanaka et al. | 429/99 |
| 4,863,812 | 9/1989 | Ueda et al. | 429/9 |

FOREIGN PATENT DOCUMENTS 2913361 10/1980 Fed. Rep. of Germany.
64-40830 3/1989 Japan.

OTHER PUBLICATIONS

United Kingdom Search Report, Application No. 9101203.9, Feb. 28, 1991.

*Primary Examiner*—David M. Gray
*Attorney, Agent, or Firm*—Sandler, Greenblum & Bernstein

[57] ABSTRACT

A battery housing structure is provided for a camera having a battery chamber for housing a battery. The battery housing structure comprises a lid for opening and closing an opening of the battery chamber and an operating member that is movably supported by the lid. Various embodiments are disclosed that provide a battery housing structure in which the operating member can be provided in a narrow space, and in which the battery chamber can be easily opened and closed.

18 Claims, 8 Drawing Sheets

BATTERY HOUSING STRUCTURE

BACKGROUND OF THE INVENTION

1. Field of the Invention

The present invention relates to a battery housing structure provided in a camera.

2. Description of the Related Art

Cameras are typically provided with a battery chamber for housing a battery. In a conventional battery chamber, a lid for opening and closing an opening of the battery chamber is provided with an operating member including a claw engagable with an inner wall of the camera body. The operating member is rotated, for example, by a coin, so that the claw engages with the camera body at a position such that the lid is fixed in the closed position.

The claw of the operating member is extended radially of the operating member, and the camera body is provided with an engagable portion with which the claw is engaged. The operating member must have a certain thickness, to allow the provision thereon of the claw. Therefore, in a conventional device, the camera body must be provided with a space which can accommodate the operating member and the claw. This need to provide such a space is sometimes difficult, from the viewpoint of a desired miniaturization of the camera.

SUMMARY OF THE INVENTION

Therefore, an object of the present invention is to provide a battery housing structure in which the operating member can be provided even in a narrow space, and the battery chamber can be easily opened and closed.

According to the present invention, there is provided a battery housing structure for a camera comprising, a camera body having a battery chamber for housing a battery, a lid for opening and closing an opening of the battery chamber, and an operating member. The camera body has an engagable portion formed inside the battery chamber. The operating member is movably supported by the lid, and is provided with an engaging boss which projects into a space formed around an electrode of a battery housed in the battery chamber and is able to be engaged with the engagable portion formed inside the battery chamber. Accordingly, when the lid is placed over and closes the opening of the battery chamber, the engaging boss is engaged with the engagable portion and the engagable portion is sandwiched between the engaging boss and the lid, to thereby fix the lid in the closed portion.

Further, according to the present invention, there is provided a battery cover comprising a lid for opening and closing the opening of a battery chamber, and an operating member movably supported by the lid. The operating member is provided with an engaging projection which projects into a space formed around an electrode of a battery housed in the battery chamber and is engagable with the camera body. Accordingly, when the lid covers and closes the opening, the projection is engaged with the camera body, whereby the camera body is sandwiched between the lid and the engaging projection, to thereby fix the lid in the closed position.

Still further, according to the present invention, there is provided a battery cover comprising a lid for opening and closing the opening of a battery chamber, an operating member movably supported by the lid, and a positioning mechanism. The positioning mechanism positions the operating member at a predetermined position of the lid, and is provided with an engaging notch formed at the predetermined position. The operating member is provided with a positioning projection which is engagable with the engaging notch.

Furthermore, according to the present invention, there is provided a device for operating a lid for opening and closing the opening of a battery chamber, the operating device comprising an operating member movably supported by the lid, and a positioning mechanism. The positioning mechanism positions the operating member at a predetermined position of the lid, and is provided with an engaging notch formed at a predetermined position. The operating member is provided with a positioning projection which is engagable with the engaging notch.

Also, according to the present invention, there is provided a camera body including a battery cover for opening and closing an opening of a battery chamber formed in said camera body and housing a battery therein, the camera body comprising, a screw for securely fitting the battery cover to the camera body and a lid for opening and closing the opening of the battery chamber. The screw is provided near the opening of the battery chamber and protrudes from the camera body. The lid is provided with a guide recess into which a head portion of the screw is inserted, and the head portion of the screw is guided into and out of the guide recess when opening and closing the lid.

BRIEF DESCRIPTION OF THE DRAWINGS

The present invention will be better understood from the description of the preferred embodiment of the invention set forth below, together with the accompanying drawing, in which.

DESCRIPTION OF THE PREFERRED EMBODIMENTS

The present invention will now be described with reference to the embodiments shown in the drawings.

Figure 1:
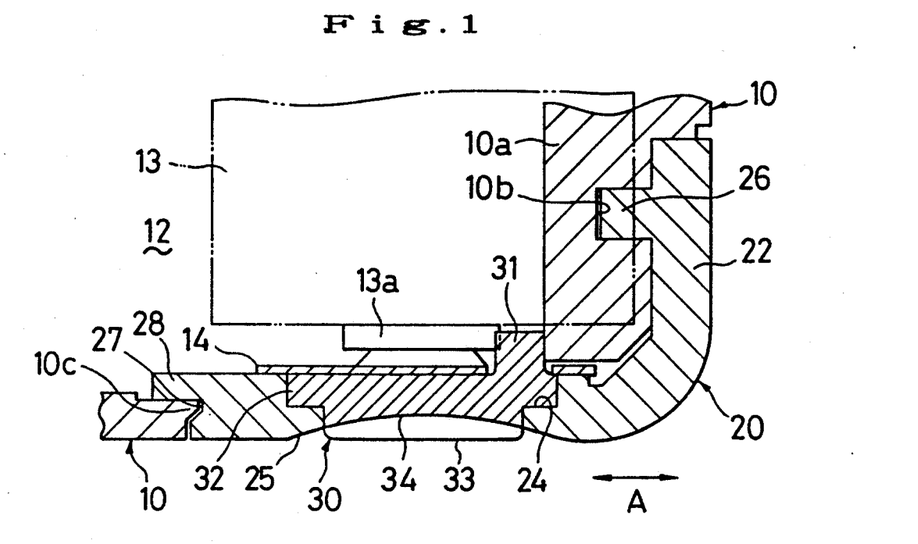
FIG. 1 is a sectional view showing a first embodiment of the present invention.

FIG. 1 shows a first embodiment of the present invention, wherein a battery 13 is housed in a battery chamber 12 formed in a camera body 10, and a protrusion 10a is formed on an inner wall of the camera body 10 to support a side surface of the battery 13. In this embodiment, two batteries 13 are housed in the battery chamber 12, and the protrusion 10a is positioned between the two batteries 13 as shown, for example, in FIG. 11. A lid 20 is provided for opening and closing the opening of the battery chamber 12. In this embodiment, the lid 20 is slidably supported by the camera body 10, and is moved in the directions shown by an arrow A when opening and closing the opening of the battery chamber 12.

Figure 2:
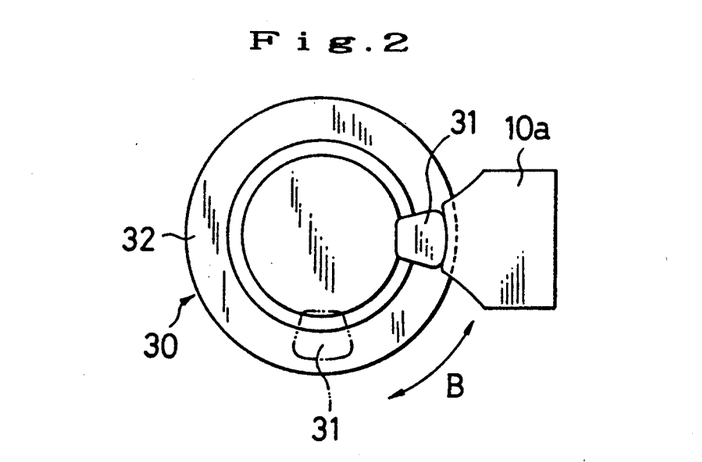
FIG. 2 is a plane view showing an operating member.

The batteries 13 are housed in the battery chamber 12 in such a manner that the positive electrodes 13a thereof face the opening of the battery chamber 12, and battery contact plate 14 to be brought into contact with the positive electrode 13a is fixed to the inner surface of the lid 20 by heat bonding or screws. A disk-shaped operating member 30 is rotatably supported by the lid 20, and is provided with an engaging boss 31 projecting into a space formed around the positive electrode 13a of the battery 13. The engaging boss 31 is engagable with the protrusion 10a of the camera body 10. Namely, when the lid 20 is in the closed position as shown in FIG. 1, the engaging boss 31 is engaged with the protrusion 10a by rotating the operating member 30, whereby the lid 20 is fixed in the closed position. Namely, as shown in FIG. 2, the engaging boss 31 is rotated in the directions shown by an arrow B to be engaged with or released from the protrusion 10a. When the engaging boss 31 is engaged with the protrusion 10a, the protrusion 10a is sandwiched between the engaging boss 31 and the lid 20, to thereby fix the lid 20 in the closed position. When the engaging boss 31 is released from the protrusion 10a, the lid 20 can be removed from the camera body 10.

Figure 3A:
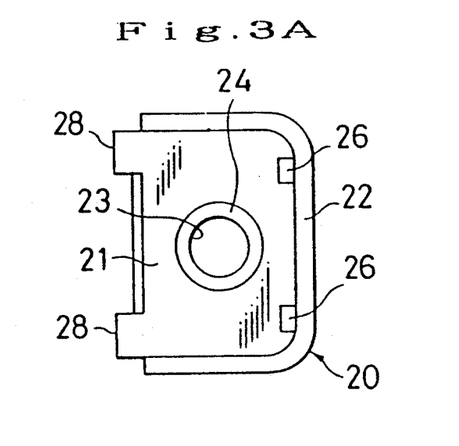
FIG. 3A is a plane view showing an inner surface of a lid.
Figure 3B:
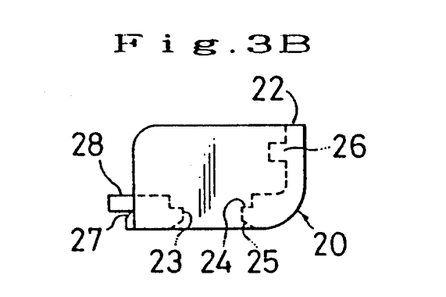
FIG. 3B is a side view showing the lid shown in FIG. 3A.
Figure 3C:
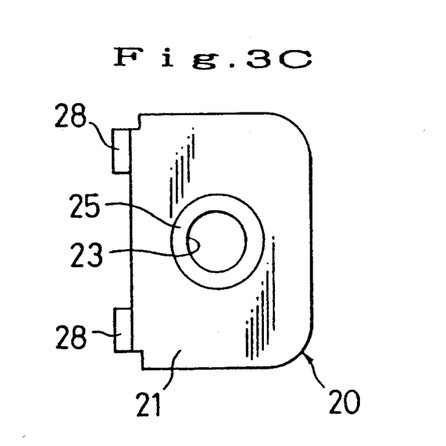
FIG. 3C is a plane view showing an outer surface of the lid shown in FIG. 3A.

FIGS. 3A, 3B, and 3C show a construction of the lid 20. As shown in these figures, the lid 20 comprises a closing plate 21 for closing the opening of the battery chamber 12, and a side wall 22 engagable with a side surface of the camera body 10. A hole 23 is formed in a center portion of the closing plate 21, and an annular supporting step 24 is formed along a periphery of the hole 23 and at a position close to the inner surface of the closing plate 21. The operating member 30 is rotatably supported by the supporting step 24, as shown in FIG. 1, and is held in the supporting step 24 or the lid 20 by the battery contact plate 14.

Figure 4A:
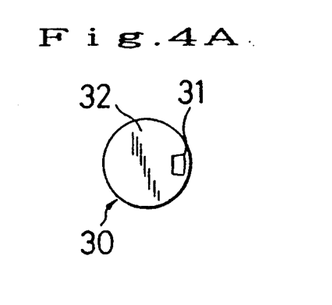
FIG. 4A is a plane view showing an inner surface of an operating member.
Figure 4B:
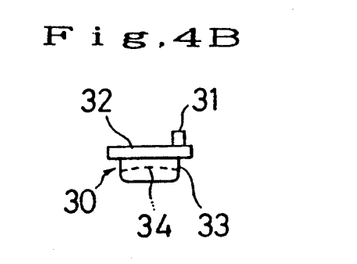
FIG. 4B is a side view showing the operating member shown in FIG. 4A.
Figure 4C:
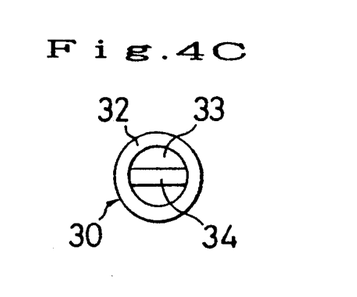
FIG. 4C is a plane view showing an outer surface of the operating member shown in FIG. 4A.

As shown in FIGS. 4A, 4B, and 4C, the operating member 30 comprises a disk 32 having an engaging boss 31 formed on an inner surface thereof and an operating portion 33 projecting outward therefrom. The disk 32 is engaged with and is rotatably supported by the supporting step 24 of the lid 20. A coin groove 34 is formed on an outer surface of, and extends across the diameter of, the operating portion 33; the bottom surface of the coin groove 34 being curved to coincide with an outer peripheral surface of a coin. Note that, as shown in FIGS. 3B and 3C, an annular concave portion 25 is formed in an outer surface of the closing plate 21 to allow a free movement of a coin.

The lid 20 can be moved linearly in the directions shown by the arrow A as described above (FIG. 1), and to guide the lid 20 during such a movement, the lid 20 is provided with a guide boss 26 on an inner wall of the side wall 22. The camera body 10 is provided with a corresponding guide recess 10b. Namely, the guide boss 26 is inserted in the guide recess 10b, and thus the movement of the lid 20 is guided by the camera body 10 when opening and closing the opening of the battery chamber 12. Small grooves 27 and claws 28 are provided on a tip portion of the lid 20, and are engagable with a inner peripheral edge 10c of the opening of the camera body 10, as shown in FIG. 1.

An operation of this embodiment is described below.

In a usual camera operating state, i.e., when the lid 20 is in the closed position, the operating member 30 is set at a position in which the engaging boss 31 is engaged with the camera body 10. Also, in this state, the protrusion 10a is sandwiched between the engaging boss 31 and the lid 20, and the guide boss 26, and the claws 28 are engaged with the camera body 10. Therefore, with reference to FIG. 1 the lid 20 can move neither in a lateral direction, nor a vertical direction, Thus, the lid 20 is firmly fixed over and closes the battery chamber 12.

When the lid 20 is opened, to replace the battery in the camera, for example, the operating member 30 is rotated by using a coin or the like, whereby the engaging boss 31 is released from the protrusion 10a of the camera body 10. As a result, the lid 20 can be moved in the direction shown by the arrow A in FIG. 1. Namely, if the lid 20 is moved to the right in FIG. 1, the battery chamber 12 is opened. At this time, if the engaging boss 31 is rotated by about 90 degrees, as shown by a chain line in FIG. 2, the engaging boss 31 does not interfere with the protrusion 10a, and thus the lid 20 can be smoothly removed from the battery chamber 12.

Note that, although the lid 20 is slidably supported by the camera body 10 in the above embodiment, the present invention is not restricted to this construction; namely, the lid 20 can be hinged to the camera body 10.

Further, although the positive electrode 13a is projected from the battery in the above embodiment, the present invention can be applied to a battery housing structure for housing a battery in which the negative electrode is projected from the battery body.

As described above, since the above embodiment is constructed in such a manner that engaging boss 31 projects into a space formed around a projected positive electrode 13a of the battery 13, the engaging boss 31 can be provided in even a small space. Further, since the engaging boss 31 is engaged with and is released from the camera body 10 by only a rotation of the engaging boss 31, the battery chamber 12 is easily opened and closed.

FIGS. 5, 6, 7A and 7B show a second embodiment of the present invention. In these drawings, the same parts are shown by the same reference numerals as used for the first embodiment.

Figure 5:
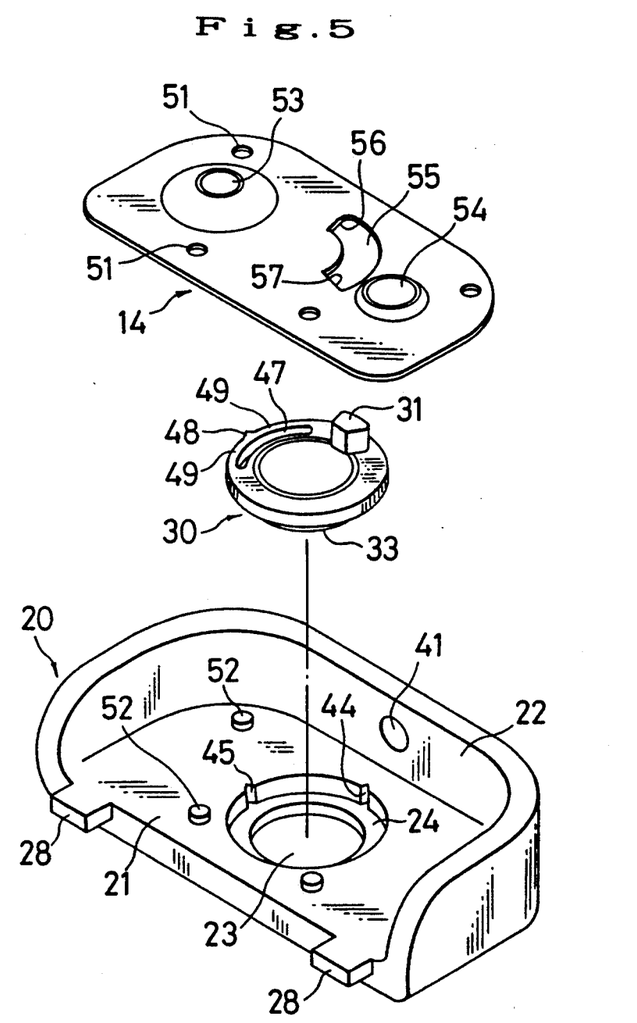
FIG. 5 is a perspective view showing a second embodiment of the present invention, in which an opening and closing mechanism is in a disassembled state.
Figure 6:
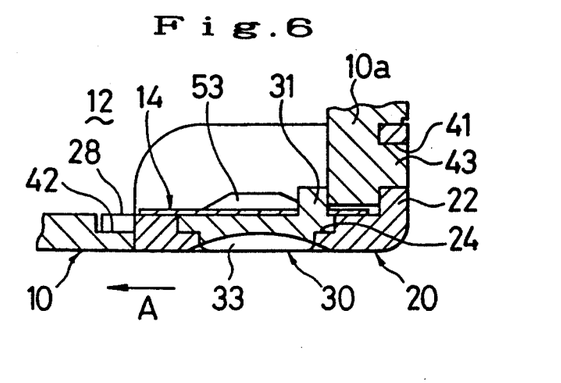
FIG. 6 is a sectional view of the second embodiment, taken along the line VI—VI of FIG. 7B.

With reference to FIG. 5, in which an opening and closing mechanism of a lid 20 is shown in a disassembled state, the lid 20 is provided with a pair of claws 28 and 28 formed at an edge portion of a closing plate 21, and a guide recess 41 formed in a side wall 22. As shown in FIG. 6, the claws 28 and 28 are engaged with a receiving edge 42, and the guide recess 41 is fitted over a guide boss 43 formed on a camera body 20. Therefore, the guide recess 41 is engaged with the guide boss 43 of the camera body 10, and the claws 28 and 28 are engaged with the receiving edge 42 when the lid 20 is moved in the direction shown by an arrow A in FIG. 6, to be thereby attached to the camera body 10 and close the opening of the battery chamber 12.

Referring back to FIG. 5, the lid 20 is provided with a hole 23 at the center position of the closing plate 21, and an outer periphery of the hole 23 is provided with an annular supporting step 24 in which a disk-shaped operating member 30 is rotatably and slidably supported. The annular supporting step 24 is provided with engaging notches 44 and 45 on an inner surface of the hole 23; the engaging notch 44 being positioned close to the guide recess 41 and the engaging notch 45 being positioned about 90 degrees counterclockwise from the engaging notch 44, when the lid 20 is viewed from above in FIG. 5. The operating member 30 is provided with a positioning projection 48 on an outer surface thereof, which positioning projection 48 is engagable with the engaging notches 44 and 45.

An operating portion 33 formed on a lower surface of the operating member 30 is inserted into the hole 23 and faces the outside of the lid 20. An engaging boss 31 is formed on an upper surface of the operating member 30 and is engagable with a protrusion 10a formed on the camera body 10 as shown in FIG. 6, in such a manner that the protrusion 10a is sandwiched between the engaging boss 31 and the side wall 22 of the lid 20, whereby the lid 20 is fixed to the camera body 10.

The operating member 30 is formed from a plastic material and has a slot 47 extending in an arc shape along a periphery thereof. A positioning projection 48 is formed on an outer peripheral surface of the operating member 30 and is located at a position opposite to the center of the slot 47. Namely, the positioning projection 48 is resiliently and integrally formed with the operating member 30 and can be elastically displaced in a radial direction due to the slot 47. Thus strip portions 49 and 49 formed on both sides of the positioning projection 48 are elastically deformed. Namely, a click action spring is constructed by the strip portions 49 and 49. Accordingly, when the positioning projection 48 is engaged with an inner vertical surface of the annular supporting step 24, the strip portions 49 and 49 are deformed to allow the positioning projection 48 to be pushed inward, and when the positioning projection 48 is engaged with the engaging notch 44 or 45, the positioning projection 48 is projected outward by the resilient spring force of the strip portions 49 and 49.

A battery contact plate 14 is attached to the closing plate 21 of the lid 20, and holds the operating member 30 against the lid 20. The battery contact plate 14 is provided with connecting holes 51 in which fixing pins 52 formed on the closing plate 21 are inserted, respectively. The fixing pins 52 are inserted into the connecting holes 51 and the head portions of the fixing pins 52 are deformed by heating, to fix the battery contact plate 14 to the closing plate 21. The battery contact plate 14 is also provided with electrode portions 53 and 54 having a truncated cone shape which are engagable with the electrodes of respective batteries, not shown.

An arc-shaped restriction slit 55 is formed in the battery contact plate 14, positioned between the electrode portions 53 and 54, and the engaging boss 31 of the operating member 30 is extended through the restriction slit 55 and projects from the battery contact plate 14. The restriction slit 55 is formed along an arc through which the engaging boss 31 is rotated, and is extended by 90 degrees around the axis of the operating member 30. The end portions 56 and 57 of the restriction slit 55 serve as stoppers by which the movement of the engaging boss 31 is limited.

An operation of the second embodiment is described below with reference to FIGS. 7A and 7B.

Figure 7A:
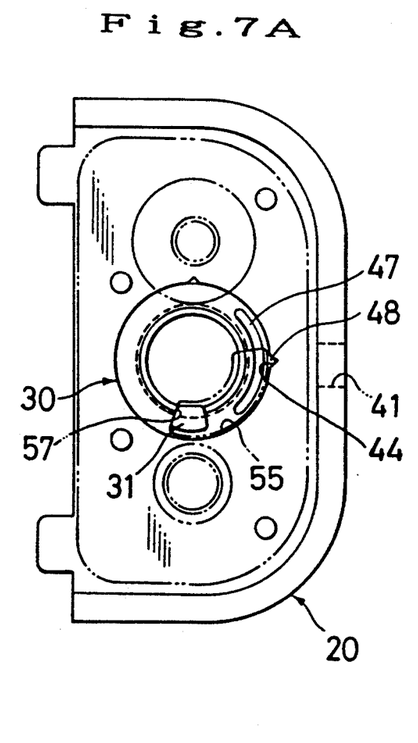
FIG. 7A is a plane view showing a lid of the second embodiment when an operating member is in the open position.
Figure 7B:
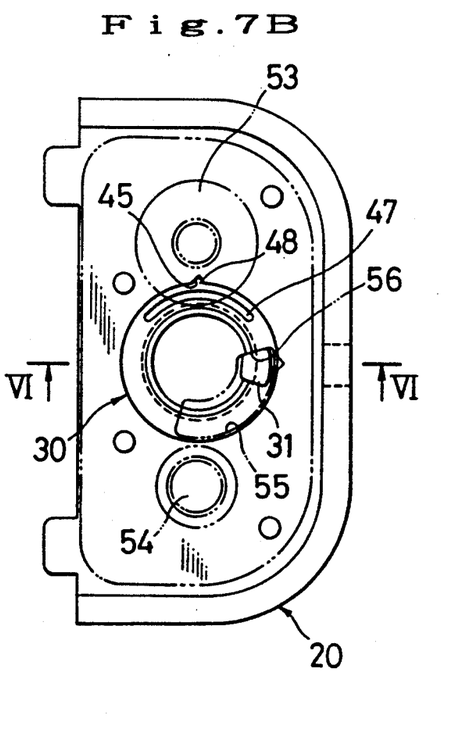
FIG. 7B is a plane view showing the lid when the operating member is in the closed position.

When the lid 20 is operated to open or close the battery chamber 12, and the operating member 30 is in an open position as shown in FIG. 7A, the positioning projection 48 is engaged with the engaging notch 44 located close to the guide boss 41 and the engaging boss 31 is released from the protrusion 10a of the camera body 10 (FIG. 6). Accordingly, the lid 20 can be moved relative to the camera body 10, and the battery chamber 12 can be opened or closed by moving the lid 20 to the right or left in FIG. 6. At this time, the engaging boss 31 is engaged with the stopper 57 of the restriction slit 55, and thus the operating member 30 cannot be further rotated in the clockwise direction.

When the lid 20 is fixed to the camera body 10 to close the opening of the battery chamber 12, the operating member 30 is rotated counterclockwise from the position shown in FIG. 7a. As a result, the positioning projection 48 is released from the engaging notch 44 and is engaged with an inner wall of the annular supporting step 24, whereby the strip portions 49 and 49 are deformed, and accordingly, the positioning projection 48 is pushed inward of the operating member 30. Thereafter, when the positioning projection 48 reaches the engaging notch 45, as shown in FIG. 7B, the positioning projection 48 is projected outward and engaged with the engaging notch 45, by the spring force of the strip portions 49 and 49. In this state, the engaging boss 31 is engaged with the protrusion 10a of the camera body 10 (FIG. 6), and thus the lid 20 cannot be moved in the opening direction thereof. At this time, the engaging boss 31 is also engaged with the stopper 56 of the restriction slit 55, and thus the operating member 30 cannot be further rotated in the counterclockwise direction.

Figure 8:
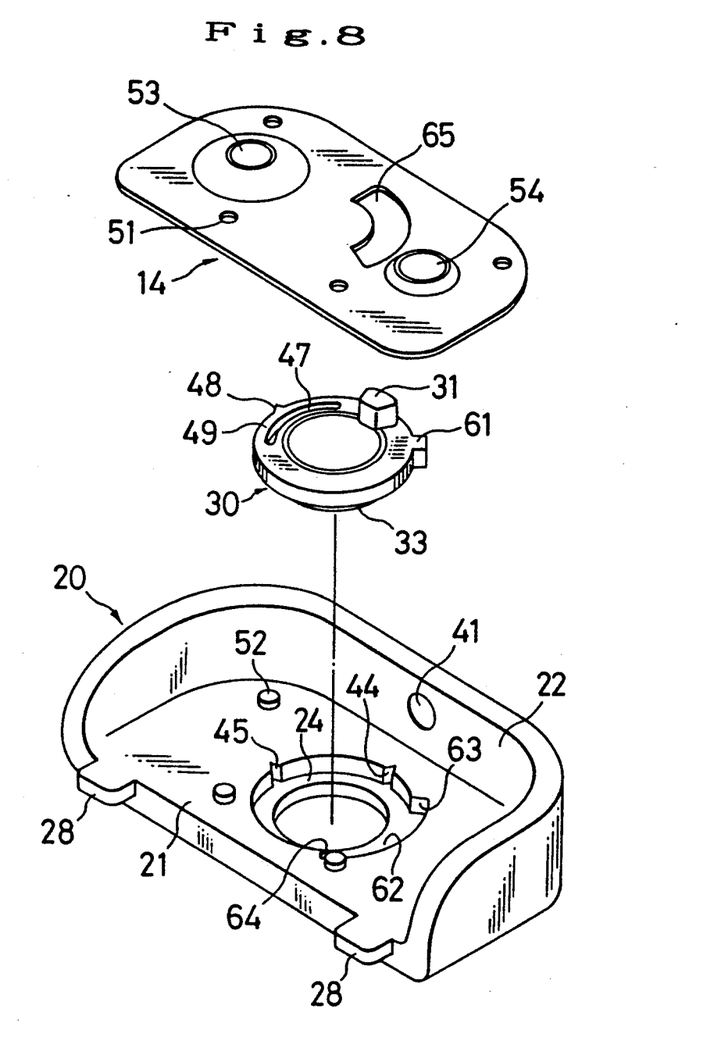
FIG. 8 is a perspective view showing a third embodiment of the present invention, in which the opening and closing mechanism is in a disassembled state.
Figure 9A:
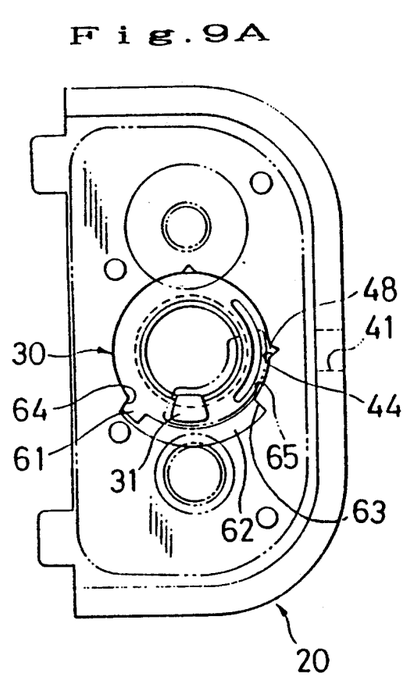
FIG. 9A is a plane view showing a lid of the third embodiment when an operating member is in the open position.
Figure 9B:
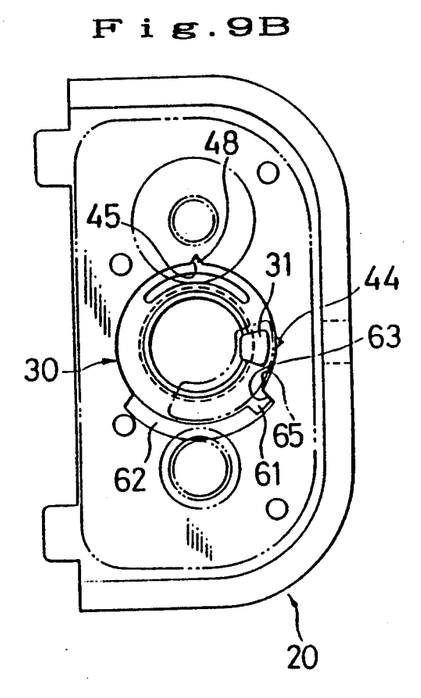
FIG. 9B is a plane view showing the lid of the third embodiment when the operating member is in the closed position.

FIGS. 8, 9A, and 9B show a third embodiment of the present invention. In these drawings, the same parts are shown by the same reference numerals as used for the above embodiments.

Although the third embodiment has basically the same construction as the second embodiment, the construction for restricting a rotation of the operating member 30 is different from that of the second embodiment. Namely, the operating member 30 is provided with an engaging projection 61 formed on an outer surface of the operating member 30 and extending in a radial direction thereof. The lid 20 is provided with a restriction groove 62, in which the engaging projection 61 is moved, formed on a wall surface of the annular supporting step 24. The restriction groove 62 is extended by about 90 degrees around the axis of the operating member 30, and the end portions 63 and 64 thereof act as stoppers for limiting the movement of the engaging projection 61.

Further, an arc-shaped slit 65 formed in the battery contact plate 14 is made longer than the restriction slit 55 of the second embodiment, and the end portions of this slit 65 do not act as stoppers for limiting the movement of the engaging boss 31. Namely, as shown in FIGS. 9A and 9B, when the positioning projection 48 of the operating member 30 is engaged with the engaging notch 44 or 45, the engaging boss 31 is positioned at a position apart from the end portion of the slit 65.

Since the remaining construction of the third embodiment is the same as that of the second embodiment, an explanation thereof is omitted.

The operation of the third embodiment is basically similar to that of the second embodiment, except that the manner in which a rotation of the operation member 30 is restricted is different from that of the second embodiment.

As shown in FIG. 9A, when the lid 20 is moved relative to the camera body 10, to open or close the opening of the battery chamber 12, the positioning projection 48 is engaged with the engaging notch 44 close to the guide recess 41, and accordingly, the engaging boss 31 is released from the protrusion 10a of the camera body 10 (FIG. 6). At this stage, the engaging projection 61 is engaged with the stopper 64 of the restriction groove 62, and thus the operating member 30 cannot be rotated further in the clockwise direction.

When the lid 20 is to be fixed to the camera body 10 and close the opening of the battery chamber 12, if the operating member 30 is rotated counterclockwise from the state shown in FIG. 9A, the positioning projection 48 is released from the engaging notch 44, is moved while engaged with the inner wall of the annular supporting step 24, and is engaged with the engaging notch 45. At this time, the engaging projection 61 is engaged with the stopper 63 and thus a further rotation in the counterclockwise direction of the operating member 30 is restricted.

As described above, according to the second and third embodiments, a member such as a flat spring is not provided between the operating member 30 and the lid 20, as in a conventional device, and therefore, the fitting of the lid 20 to the camera body 10 is simplified in that the battery contact plate 14 is attached to the lid 20 after the operating member 30 is disposed in the annular supporting step 24. Namely, the assembly of the lid 20 and the operating member 30 is very easy. Further, since the positioning projection 48 having an elasticity is integrated with the operating member as one body, the flat spring becomes unnecessary, and thus the number of parts is reduced in comparison with those needed for a conventional device.

Figure 10:
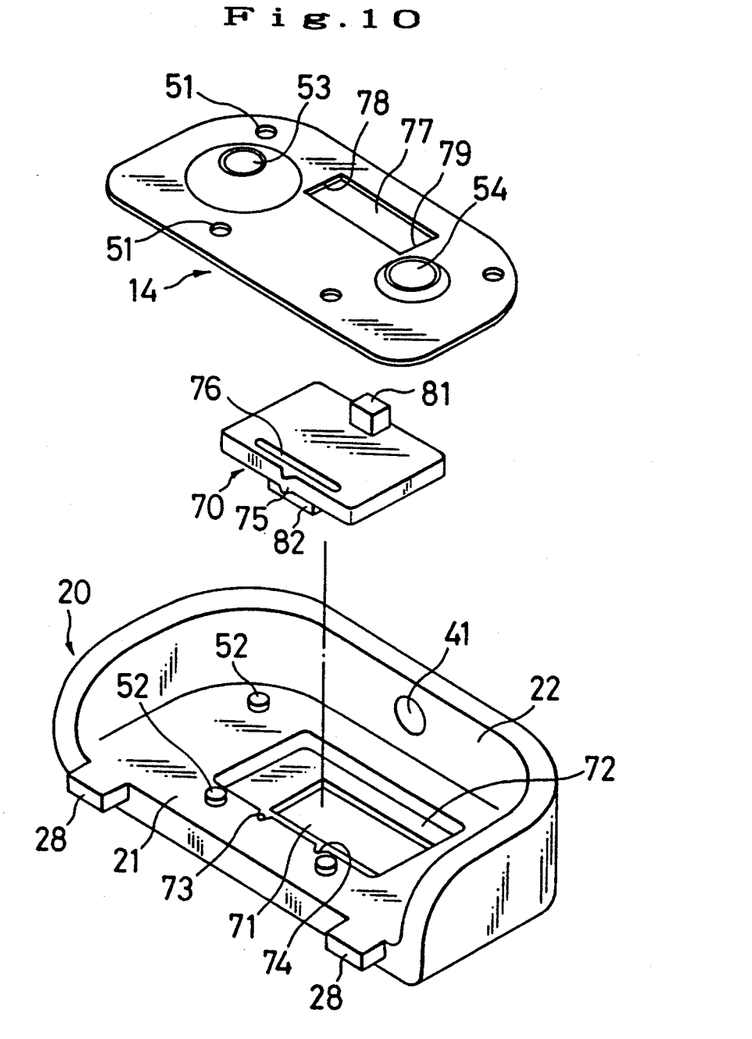
FIG. 10 is a perspective view showing a fourth embodiment of the present invention, in which an opening and closing mechanism is in a disassembled state.

FIG. 10 shows a fourth embodiment of the present invention. In the above embodiments, the operating member 30 is rotatably supported by the lid 20, but in the fourth embodiment an operating member 70 is linearly displaced.

Namely, the lid 20 is provided with a rectangular hole 71 in the closing plate 21, and an outer periphery of the hole 71 is provided with a supporting step 72 by which the operating member 70 is slidably supported. The operating member 70 is a rectangular plate and has an operating portion 82 similar to that of the above embodiments; the operating portion 82 projecting through the hole 71. The supporting step 72 is provided with engaging notches 73 and 74 on an inner surface of the hole 71, and the operating member 70 is provided with a positioning projection 75 on an outer surface thereof; the positioning projection 75 being engagable with the engaging notches 73 and 74.

The operating member 70 is formed from a plastic material and is provided with a slot 76 extending in a straight line along periphery of the operating member 70. The positioning projection 75 is formed on an opposite surface of the slot 76, and is elastically displacable in a width direction of the operating member 70, due to the slot 76. Accordingly, the positioning projection 75 is engaged with the engaging notch 73 or 74, whereby the operating member 70 is fixed in an open or closed position.

The battery contact plate 14 is attached to the closing plate 21 of the lid 20 and holds the operating member 70 against the lid 20. The battery contact plate 14 is provided with a rectangular restriction slit 77 in which an engaging boss 81 formed on the operating member 70 is inserted, and the end portions 78 and 79 of the restriction slit 77 act as stoppers with which the engaging boss 81 is engaged.

The remaining construction and the operation of the fourth embodiment are the same as those of each of the above embodiments.

Figure 11:
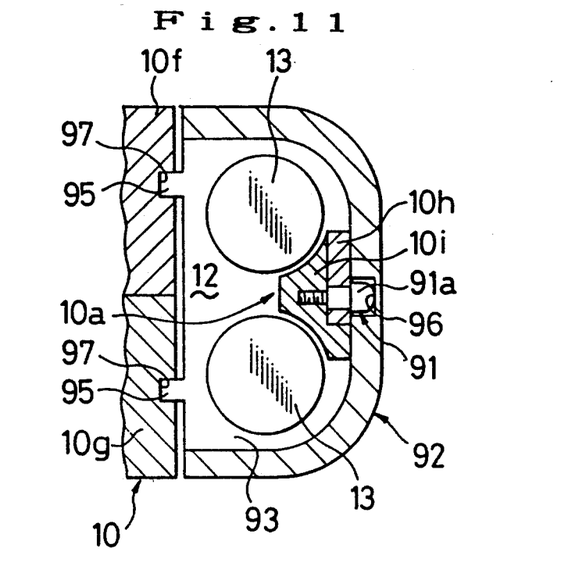
FIG. 11 is a horizontal sectional view showing a fifth embodiment of the present invention.
Figure 12:
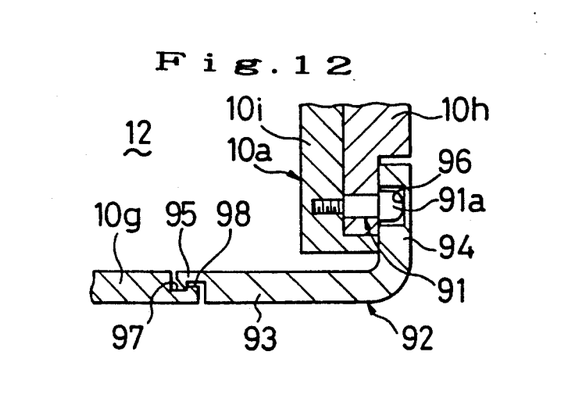
FIG. 12 is a lateral sectional view of FIG. 11.
Figure 13:
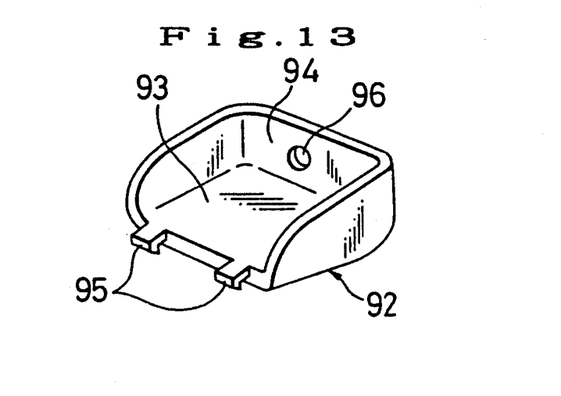
FIG. 13 is a perspective view showing a lid of the fifth embodiment.

FIGS. 11, 12 and 13 show a fifth embodiment of the present invention. In these drawings, the same parts are shown by the same reference numerals as used for the above embodiments.

The camera body 10 is formed from a plastic material, for example, and constructed in two parts, i.e., a front part 10f and a rear part 10g, connected to each other by a plurality of metal screws. The battery chamber 12 for housing a battery therein is formed in a side part of the camera body 10, and the protrusion 10a supporting a side surface of a battery 13 is formed on an inner wall defining the battery chamber 12. An outer part 10h of the protrusion 10a is integrally formed with the front part 10f of the camera body 10 as one body, and an inner part 10i of the protrusion 10a is integrally formed with the rear part 10g of the camera body 10 as one body.

A screw 91, i.e., one of the screws for assembling the camera body 10, connects the outer part 10h and the inner part 10i of the protrusion 10a to each other. The screw 91 is provided near the opening of the battery chamber 12, and a head 91a of the screw 91 protrudes outward from the camera body 10.

A lid 92 is provided to open and close the opening of the battery chamber 12. As shown in FIG. 13, the lid 92 is provided with a closing plate 93 formed on the same plane as the bottom of the camera body 10, and a side wall 94 rising from an outer periphery of the closing plate 93 and extending perpendicular to the closing plate 93. A pair of claws 95 and 95, projecting in a horizontal direction, are formed on an edge of the closing plate 93, and a guide recess 96 is formed in the side wall 94. As shown in FIGS. 11 and 12, the claws 95 and 95 can be engaged with hollows 97 and 97 formed at edges of the front part 10f and the rear part 10g, respectively. The head 91a of the screw 91 is inserted into the recess 96.

When the lid 92 is attached to the opening of the battery chamber 12, the claws 95 are aligned with the hollows 97, the head 91a of the screw 91 is aligned with the guide recess 96, and the lid 92 is moved toward the camera body 10. At this time, the claws 95 are engaged with projections 98 (refer to FIG. 12) formed at side parts of the hollows 97, and the lid 92 is thereby slid onto the camera body 10. At the same time, the guide recess 96 is slid over the head 91a of the screw 91. Then the claws 95 are engaged with the hollows 97, and the head 91a of the screw 91 is inserted to and engaged with the guide recess 96. Thus, the lid 92 closes the opening of the battery chamber 12.

On the other hand, when opening the battery chamber 12, the closing plate 93 of the lid 92 is pressed inward so that the claws 95 are released from the hollows 97, and while maintaining this state, the lid 92 is slidably moved to the right in the drawings. At this time, the guide recess 96 of the lid 92 is slid over the head 91a of the screw 91.

Accordingly, the lid 96 is guided by the screw 91 when opening and closing the battery chamber 12, and because the screw 91 is made of a metal material, it is stronger than a conventional device in which a guide member formed from a plastic is provided. Therefore, the structure for guiding the lid 91 when opening and closing the opening of the battery chamber is very firm. Further, since one of the screws for assembling the camera body 10 is used for holding the lid 92 in the closed position, the structure of the lid 92 is simplified in comparison with a conventional device.

Note that, although the guide recess 96 is formed on an inner surface of the side wall 94 of the lid 92 in the fifth embodiment, the guide recess 96 may be formed in the side wall 94 as a through hole, for example.

Although the lids 20 and 92 are slidably supported by the camera body 10 in each of the embodiments, the lids 20 and 92 may be rotatably supported to the camera body 10 by a hinge, for example.

Further, although the embodiments of the present invention have been described herein with reference to the accompanying drawings, obviously many modifications and changes may be made by those skilled in this art without departing from the scope of the invention.

The present disclosure relates to subject matter contained in Japanese Utility Model Application No. 2-4490, filed on Jan 22, 1990, which was published on Oct. 3, 1991 as Japanese Unexamined Utility Model Publication No. 3-96,630; in Japanese Utility Model Application No. 2-18,783, filed on Feb. 28, 1990, which was published on Nov. 13, 1991 as Japanese Unexamined Utility Model Publication No. 3-110,425; and in Japanese Utility Model Application No. 2-91,062, filed on Aug. 30, 1990, which has been published as Japanese Unexamined Utility Model Publication No. 4-48,157, on Apr. 23, 1992, all of which are expressly incorporated herein by reference in their entireties.

We claim:

1. A battery housing structure for a camera, said battery housing structure comprising:
    a camera body including a battery chamber for housing a battery, said battery chamber including an engageable portion formed inside thereof and an opening through which said battery is inserted thereto;
    a lid for opening and closing said opening of said battery chamber; and
    an operating member movably supported by said lid, said operating member including an engaging boss which projects into a space formed around an electrode of a battery housed in said battery chamber and that is engageable with said engageable portion of said battery chamber, whereby, when said lid closes said opening, said engaging boss is engaged with said engageable portion, and said engageable portion is sandwiched between said engaging boss and said lid, to thereby fix said lid in a closed position over said opening of said battery chamber, and wherein said lid is provided with a hole, and said operating member is rotatably supported in said hole;
    said camera body is provided with a guide boss and said lid is provided with a guide recess in which said guide boss is inserted, whereby said lid is guided by said camera body when opening and closing said opening of said battery chamber;
    said guide boss comprising a screw, said screw comprising means for assembling said camera body, said guide boss comprising means for guiding said lid.

2. A battery housing structure according to claim 1, wherein said engagable portion is a protrusion formed on an inner wall of said camera body.

3. A battery housing structure according to 1 wherein, when said operating member is rotated in one direction, said engaging boss is engaged with said engagable portion whereby said lid is fixed in a closed position over said opening of said battery chamber, and when said operating member is rotated in a reverse direction, said engaging boss is released from said engagable portion and said lid can be removed from said opening of said battery chamber.

4. A battery housing structure for a camera, said battery housing structure comprising:
    a camera body including a battery chamber for housing a battery, said battery chamber including an engageable portion formed inside of said chamber and an opening through which a battery is adapted to be inserted;
    a lid for opening and closing said battery chamber opening; and
    a guide boss provided on said camera body, said lid having a guide recess in which said guide boss is inserted, whereby said lid is guided by said camera body when said battery chamber opening is opened and closed by said lid, wherein said guide boss is a screw used for assembling said camera body.

5. A battery housing structure for a camera, said battery housing structure comprising:
    a camera body including a battery chamber for housing a battery, said battery chamber including an engageable portion formed inside thereof and an opening through which said battery is inserted thereto;
    a lid for opening and closing said opening of said battery chamber; and
    an operating member movably supported by said lid, said operating member including an engaging boss which projects into a space formed around an electrode of a battery housed in said battery chamber and that is engageable with said engageable portion of said battery chamber, whereby, when said lid closes said opening, said engaging boss is engaged with said engageable portion, and said engageable portion is sandwiched between said engaging boss and said lid, to thereby fix said lid in a closed position over said opening of said battery chamber; and
    positioning means for positioning said operating member at a predetermined position, said positioning means including an engaging notch formed at a predetermined position of said lid, and a positioning projection formed on said operating member and engageable with said engaging notch.

6. A battery housing structure according to 5, wherein said lid is provided with a hole, said operating member is rotatably supported in said hole, and a plurality of said engaging notches are provided on an inner surface of said hole and at intervals of a predetermined angle.

7. A battery housing structure according to claim 5 wherein said operating member includes a slot extending along a periphery of said operating member, whereby said positioning projection is elastically displaced to be engaged with said engaging notch.

8. A battery housing structure according to claim 5, further comprising a plate fixed to said lid, whereby said plate said operating member against said lid.

9. A battery housing structure according to claim 8, wherein said plate is provided with a restriction slit including stoppers at both end portions thereof, said engaging boss being movable along and in said restriction slit, and when said operating member moves relative to said lid, said engaging boss moves in said restriction slit and is engaged with one of said stoppers so that the movement of said operating member is restricted.

10. A battery housing structure according to claim 5, wherein said lid is provided with a restriction groove including stoppers at both end portions thereof, said operating member includes an engaging projection movable in said restriction groove, and when said operating member moves relative to said lid, said engaging projection moves in said restriction groove and is engaged with one of said stoppers so that the movement of said operating member is restricted.

11. A battery housing structure according to claim 5, wherein said lid is provided with a rectangular hole, said operating member is slidably supported in said rectangular hole, and a plurality of said engaging notches are provided along an inner surface of said hole at predetermined intervals.

12. A battery cover for a camera, a camera body including a battery chamber for housing a battery, said battery cover being provided for opening and closing an opening of the battery chamber, said battery cover comprising:
a lid for opening and closing said battery chamber opening;
an operating member movably supported by said lid;
positioning means for positioning said operating member at a predetermined position on said lid, said positioning means including an engaging notch formed at said predetermined position, and a positioning projection formed on said operating member and engageable with said engaging notch; and
a plate fixed to said lid, whereby said plate holds said operating member against said lid.

13. A battery housing structure according to claim 12 wherein said lid is provided with a hole, said operating member is rotatably supported in said hole, and a plurality of said engaging notches are provided along an inner surface of said hole at intervals of a predetermined angle.

14. A battery housing structure according to claim 12, wherein said operating member is provided with a slot extending along a periphery of said operating member, whereby said positioning projection is elastically displaced and is engaged with said engaging notch.

15. A battery housing structure according to claim 12, wherein said plate is provided with a restriction slit including stoppers at both end portions thereof, said engaging boss being movable along and in said restriction slit, and when said operating member moves relative to said lid, said engaging boss moves in said restriction slit and is engaged with one of said stoppers so that the movement of said operating member is restricted.

16. A battery cover for a camera, a camera body including a battery chamber for housing a battery, said battery cover being provided for opening and closing a battery chamber opening, said battery cover comprising:
a lid for opening and closing said battery chamber opening;
an operating member movably supported by said lid;
positioning means for positioning said operating member at a predetermined position on said lid, said positioning means including an engaging notch formed at said predetermined position, and a positioning projection formed on said operating member and being engageable with said engaging notch, wherein said lid is provided with a restriction groove including stoppers at both end portions thereof, said operating member including an engaging projection movable along and in said restriction groove, and when said operating member moves relative to said lid, said engaging projection moves in said restricting groove and is engaged with one of said stoppers so that the movement of said operating member is restricted.

17. A camera body including a battery cover for opening and closing an opening of a battery chamber, formed in said camera body to house a battery therein, said camera body comprising:
a screw for assembling said camera body, said screw being provided near said opening of said battery chamber and protruding from said camera body; and
a lid for opening and closing said opening of said battery chamber, said lid having an guide recess into which a head of said screw is inserted, said guide recess being guided by said head of said screw when opening and closing said lid over said opening of said battery chamber.

18. The camera body according to claim 17, said screw comprising means for assembling said camera body and said head comprising means for guiding said lid.

* * * * *

UNITED STATES PATENT AND TRADEMARK OFFICE
CERTIFICATE OF CORRECTION

PATENT NO. : 5,315,336

DATED : May 24, 1994

INVENTOR(S) : Shinya SUZUKA et al.

It is certified that error appears in the above-indentified patent and that said Letters Patent is hereby corrected as shown below:

At column 10, line 19 (claim 3, line 1) of the printed patent, change "to 1" to ---to claim 1---.
At column 11, line 14 (claim 8, line 3) of the printed patent, change "plate said" to ---plate holds said---.
At column 11, line 54 (claim 13, line 1) of the printed patent, change "claim 12" to ---claim 12,---.
At column 12, line 48 (claim 17, line 10) of the printed patent, change "an" to ---a---.

Signed and Sealed this

Twenty-eighth Day of November 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,315,336
DATED : May 24, 1994
INVENTOR(S) : Shinya Suzuka, et al

It is certified that error appears in the above-indentified patent and that said Letters Patent is hereby corrected as shown below:

On the title page, item [56]: References, after line 7 insert --4,937,606 6/1990 Soumi et al. 354/288--.

On the title page, item [56]: after line 10, Foreign Patent Documents, insert --1302240 12/1989 Japan--.

Signed and Sealed this

Sixteenth Day of January, 1996

Attest:

BRUCE LEHMAN

*Attesting Officer*   *Commissioner of Patents and Trademarks*